United States Patent [19]

Redmon et al.

[11] Patent Number: 5,449,503

[45] Date of Patent: Sep. 12, 1995

[54] PROCESS FOR SEPARATING ARSENIC ACID FROM AN AQUEOUS MIXTURE COMPRISING SULFURIC AND ARSENIC ACIDS

[75] Inventors: Charles L. Redmon, Orchard Park; Somanahalli N. Subbanna, East Amherst, both of N.Y.; Robert A. Smith, Kinnelon, N.J.

[73] Assignee: AlliedSignal Inc., Morristown, N.J.

[21] Appl. No.: 296,983

[22] Filed: Aug. 26, 1994

Related U.S. Application Data

[63] Continuation of Ser. No. 61,930, Apr. 8, 1993, abandoned.

[51] Int. Cl.$^6$ .............. C01G 28/00; C22B 30/00; C01B 17/90; C01B 9/08
[52] U.S. Cl. .......................... 423/87; 423/88; 423/617; 423/531; 423/489
[58] Field of Search .............. 423/87, 88, 617, 531, 423/489

[56] References Cited

U.S. PATENT DOCUMENTS

| | | | |
|---|---|---|---|
| 1,952,290 | 3/1934 | Schopper | 423/87 |
| 4,220,627 | 9/1980 | Fugleberg et la. | 423/42 |
| 4,769,230 | 9/1988 | Greco et al. | 423/617 |
| 4,891,207 | 1/1990 | Broome | 423/617 |
| 5,089,241 | 2/1992 | Smith et al. | 423/87 |

FOREIGN PATENT DOCUMENTS

| | | | |
|---|---|---|---|
| 225597 | 9/1985 | Czechoslovakia . | |
| 248249-A3 | 8/1987 | German Dem. Rep. . | |
| 274609A1 | 12/1989 | German Dem. Rep. . | |
| 49-47299 | 5/1974 | Japan . | |
| 83936 | 5/1984 | Japan . | |
| 169934 | 9/1984 | Japan . | |
| 372189 | 5/1932 | United Kingdom | 423/87 |
| 1444058 | 7/1976 | United Kingdom . | |
| 510430 | 7/1976 | U.S.S.R. | 423/617 |

OTHER PUBLICATIONS

R. D. Gigauri et al., "Method for obtaining Arsenic Acid Anhydride", *Soobsnch, Akad. Nauk Gruz. SSR 124(2), 309 (1986), Chem. Abs. 106(12) 94953v.*

L. Nan et al., "Kinetics of Reduction of Arsenic(V) to Arsenic(III) with Sulfur Dioxide in Aqueous Solution", Australas. Inst. Min. Metall. Publ. Ser. 1989, Jun. 1989, *Non-ferrous Smelting Symp.*, 145 (1989).

K. Gritton et al., "Metal Recovery from Metallurgical Wastes", *Society for Mining, Metallurgy and Exploration, Inc.*, Feb. 26–Mar. 1, 1990.

*Primary Examiner*—Steven Bos
*Attorney, Agent, or Firm*—Jay P. Friedenson

[57] ABSTRACT

The present invention provides a process for recovering arsenic acid from a starting mixture comprising sulfuric and arsenic acids and water. In step (a), the starting mixture is treated with a sulfur (IV) compound which will reduce the arsenic acid to arsenic (III) compound under conditions sufficient to substantially convert the arsenic acid to arsenic (III) wherein the resulting mixture comprises arsenic (III) compound, the sulfur (IV) compound, sulfuric acid, and water. In step (b), the resulting mixture is purged with gas to substantially remove the sulfur (IV) compound from the mixture wherein the purged mixture comprises the arsenic (III) compounds, sulfuric acid, and water. In step (c), the purged mixture is treated under conditions sufficient to substantially separate the arsenic (III) compounds from the purged mixture. In step (d), the separated arsenic (III) compound is reacted with an oxidizing agent to substantially convert arsenic (III) compound to arsenic acid wherein the final mixture comprises arsenic acid, unreacted oxidizing agent, and water. In step (e), impurities are removed from the final mixture to provide substantially pure aqueous arsenic acid.

25 Claims, 1 Drawing Sheet

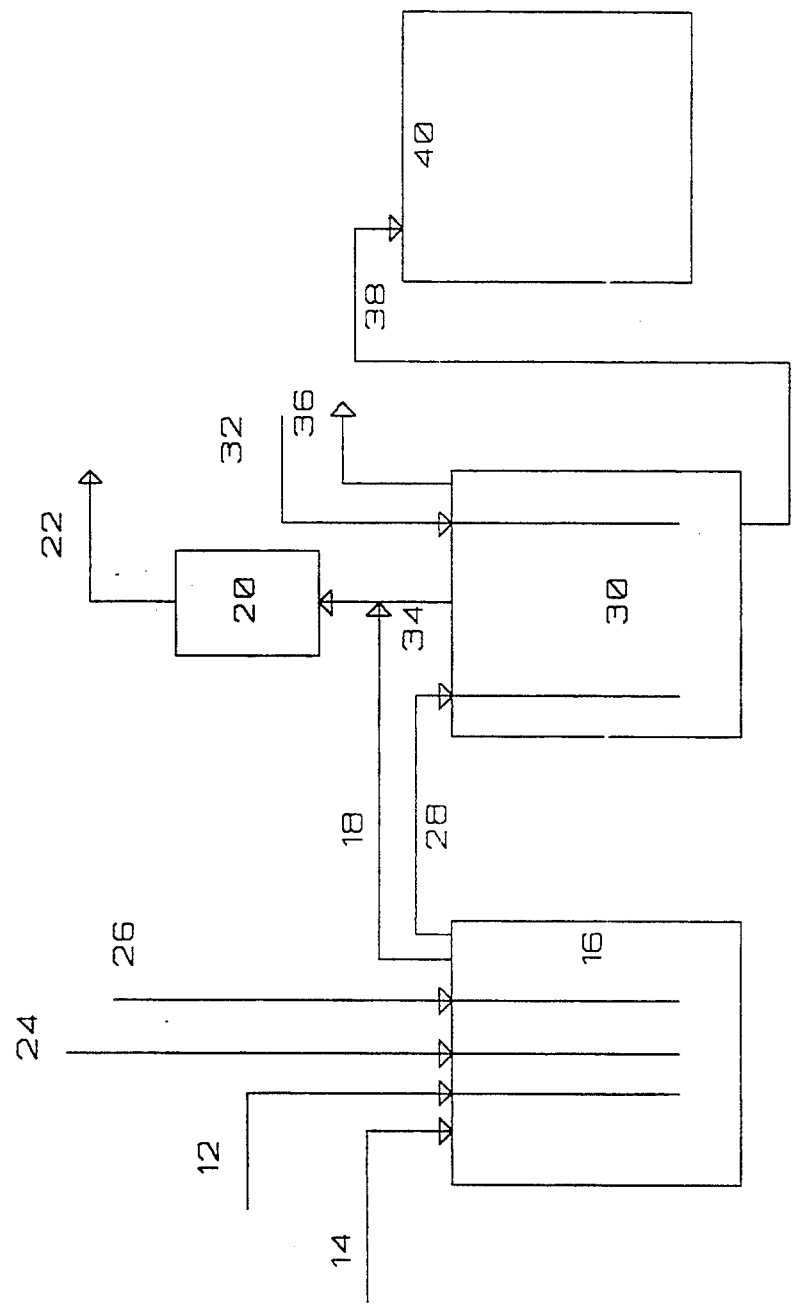

PROCESS FOR SEPARATING ARSENIC ACID FROM AN AQUEOUS MIXTURE COMPRISING SULFURIC AND ARSENIC ACIDS

This is a continuation of application Ser. No. 8/061,930 filed on Apr. 8, 1993, now abandoned.

BACKGROUND OF THE INVENTION

The present invention relates to a process for the separation of aqueous mixtures of arsenic acid or salts thereof from a waste mixture comprising sulfuric and arsenic acids and producing a high purity arsenic acid product.

Commonly assigned U.S. Pat. No. 5,089,241 describes a process for the conversion of hazardous hexafluoroarsenic acid or any salt thereof to arsenic acid. The resulting hazardous mixture comprises about 45 to about 85 weight percent sulfuric acid, about 5 to about 25 weight percent arsenic acid, and about 15 to about 40 weight percent water. The patent teaches that this hazardous waste may be rendered non-hazardous by the use of known methods.

Rather than generate waste for storage in a landfill, a process is needed which separates the arsenic acid from the waste mixture such that the separated arsenic acid may be reused. A process which also separates the sulfuric acid such that the separated sulfuric acid also could be reused would be extremely advantageous.

Attempts have been made to solve this problem of separating the arsenic acid or salts thereof from sulfuric acid in various media but the following problems have been encountered. L. Nan et al., "Kinetics of Reduction of Arsenic (V) to Arsenic (III) with Sulfur Dioxide in Aqueous Solution", Australas. Inst. Min. Metall. Publ. Ser. 1989, 6/89 (Non-ferrous Smelting Symp., 1989, 145–52) report that the reduction of arsenic acid to arsenious acid with sulfur dioxide in aqueous solution proceeds in two steps: the absorption of the sulfur dioxide from the gas phase into the aqueous phase and the reduction of the arsenic acid. Sulfuric acid was initially added to the arsenic acid to adjust pH. The weight percent of arsenic acid used was 1 to 14 while the weight percent of sulfuric acid used was 0.5 to 30. Most of the experiments were conducted with 0.01M or 0.1M initial arsenic acid and a small amount of sulfuric acid added to adjust the pH to about 4. The reference reports that when the initial arsenic acid was then increased to 1M, the arsenic reduction rate decreased by about 30 percent. The reference teaches that the reaction rate was considerably reduced in concentrated sulfuric acid solutions. Thus, the reference discourages the use of a starting material having higher concentrations of sulfuric and arsenic acids therein. Further, the reference teaches that the arsenious acid is the final product and not further reacted. See also K. Gritton et al., "Metal Recovery from Metallurgical Wastes", *Society for Mining, Metallurgy and Exploration, Inc*, Feb. 26–Mar. 1, 1990.

East German Patent 248,249-A3 dated Aug. 5, 1987 teaches a process for separating arsenic trifluoride from a product mixture containing hydrogen fluoride. The process involves reacting the mixture of arsenic trifluoride and hydrogen fluoride with arsenic trioxide and sulfuric acid wherein the hydrogen fluoride reacts with the arsenic trioxide to form arsenic trifluoride. The reference teaches that the resulting arsenic trifluoride may be used as an implantation gas in the microelectronics industry and does not teach that the arsenic trifluoride is further reacted.

U.S. Pat. No. 4,891,207 teaches the oxidation of arsenic trioxide with hydrogen peroxide to form arsenic acid. The reference does not teach how to separate arsenic acid from a mixture containing sulfuric acid.

As such, the need exists in the art for a process for separating arsenic acid from an aqueous waste mixture comprising sulfuric and arsenic acids.

SUMMARY OF THE INVENTION

We have solved this problem in the art by developing a process for separating the aqueous arsenic acid from a waste mixture comprising sulfuric and arsenic acids and producing a pure arsenic acid product.

Thus, the present invention provides a process for recovering arsenic acid from a starting mixture comprising sulfuric and arsenic acids and water. The starting mixture comprises at least about 1 weight percent arsenic acid, at least about 1 weight percent sulfuric acid, and up to about 98 weight percent water based on the total amount of the starting mixture. In step (a), the starting mixture is treated with a sulfur (IV) compound which will reduce the arsenic acid to arsenic (III) compound under conditions sufficient to substantially convert the arsenic acid to arsenic (III) compound wherein the resulting mixture comprises arsenic (III) compound, sulfur (IV) compound, sulfuric acid, and water. The term "arsenic (III) compound" as used herein means at least one of the following trivalent arsenic forms: $H_3AsO_3$, $HAsO_2$, $As_2O_3$, and $AsF_3$. In step (b), the resulting mixture is purged with inert gas to substantially remove the sulfur (IV) compound from the mixture wherein the purged mixture comprises arsenic (III) compound, sulfuric acid, and water. In step (c), the purged mixture is treated under conditions sufficient to substantially separate the arsenic (III) compound from the purged mixture. In step (d), the separated arsenic (III) compound is reacted with oxidizing agent under conditions sufficient to substantially convert the arsenic (III) compound to arsenic acid wherein the final mixture comprises arsenic acid, unreacted oxidizing agent, and water. In step (e), impurities which comprises unreacted oxidizing agent are removed from the final mixture to provide substantially pure aqueous arsenic acid.

The present process is advantageous because it recovers arsenic acid and thus, eliminates the current need for converting the hazardous arsenic waste to non-hazardous waste, stabilizing the waste, and landfilling it. The present process also separates sulfuric acid. The separated arsenic and sulfuric acids may then be reused.

Other advantages of the present invention will be apparent from the following description and attached claims.

BRIEF DESCRIPTION OF THE DRAWING

The FIGURE is a schematic of the present invention.

DETAILED DESCRIPTION OF THE INVENTION

The present invention provides a process for separating arsenic acid from a waste mixture comprising sulfuric and arsenic acids and water. Such a waste mixture may result from a process such as that disclosed by commonly assigned U.S. Pat. No. 5,089,241 which is incorporated herein by reference. Such waste mixtures may also contain acids such as hydrofluoric, phosphoric, fluosilicic, and fluosulfonic. Generally speaking, this mixture is considered poisonous and carcinogenic because the waste contains arsenic compounds and is corrosive because the pH is less than 2. In the United States for disposal of this waste, the waste must be treated such that the stabilized waste passes the Toxic Characteristics Leach Procedure Test (TCLP) established by the Environmental Protection Agency in order to be considered nonhazardous. Other countries have comparable regulations also.

In step (a), the starting mixture is treated with a sulfur (IV) compound under conditions sufficient to substantially convert the arsenic acid to arsenic (III) compound wherein the resulting mixture comprises arsenic (III) compound, sulfur (IV) compound, sulfuric acid, a small amount of unconverted arsenic acid, and water. We have discovered that in step (a), the conversion of arsenic (V) to arsenic (III) relates to the following conditions: (1) initial arsenic acid and sulfuric acid concentration; (2) water concentration in the mixture to be reacted; (3) reactor pressure; (4) degree of agitation and therefore the gas/liquid contact surface area; (5) the reaction time; and (6) the reaction temperature.

The starting mixture comprises at least about 1 weight percent arsenic acid, at least about 1 weight percent sulfuric acid, and up to about 98 weight percent water based on the total amount of the starting mixture. Preferably, the starting mixture comprises at least about 9 weight percent arsenic acid and at least about 60 weight percent sulfuric acid. A water content of at least about 30 weight percent is preferred because the conversion of the pentavalent arsenic to trivalent arsenic increases and thus reaction time decreases.

We have found that water content greater than about 30 weight percent does not significantly increase the conversion of arsenic acid to arsenic (III) compound in step (a). In a hydrogen fluoride manufacturing facility, a higher water content may be detrimental because the excess water must be reacted with oleum to enable recycling of the arsenic depleted sulfuric acid. As indicated above, significantly lower water content decreases the conversion and is neither economical nor advantageous because more unreacted arsenic acid has to be recycled.

We have also found that as the pressure increases, the solubility of the sulfur (IV) compound in the starting mixture increases. As the concentration of sulfur (IV) compound in the starting mixture increases, the conversion of arsenic acid to arsenic (III) compound increases and the reaction time decreases. We have found that pressures less than about 20 psig do not have a significant effect on the conversion or reaction time. Preferably, the sulfur (IV) compound is introduced under a pressure greater than about 20 pounds per square inch into the starting mixture in step (a). The more preferred pressure range is about 20 to about 35 psig.

We have also found that as the degree of contact between the liquid and gas phases in the reactor increases, the solubility of the sulfur (IV) compound in the starting mixtures increases. Agitation is one means of increasing the effective surface area between the reactants. We have found that agitation increases the surface contact of the gas and liquid phases and therefore, the conversion increases. The gas and liquid phases surface contact may be accomplished by employing any known agitation means. Thus preferably, the mixture is agitated in an amount sufficient to produce intimate contact between the starting mixture and the sulfur (IV) compound in step (a). A packed recirculating column may be useful for this purpose.

We have also found that as the reaction time increases, the conversion increases. The preferred reaction time for step (a) is at least about two hours. Reaction times greater than about four hours did not significantly increase the conversion. The more preferred reaction time for step (a) is about two to about four hours.

We have also found that as the reaction temperature increases, the solubility of the sulfur (IV) compound decreases and as the temperature decreases significantly, the reaction kinetics limit the reaction rate. Preferably, the reaction temperature for step (a) is about 20° C. to about 30° C.

Preferably, the sulfur (IV) compound is selected from the group consisting of sulfur dioxide gas or liquid, aqueous sulfur dioxide (sulfurous acid), and bisulfite and sulfite salts such as sodium, potassium, or ammonium. The more preferred sulfur (IV) compound is sulfur dioxide.

If sulfur dioxide is used in step (a), the following reaction occurs:

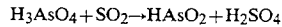

$$H_3AsO_4 + SO_2 \rightarrow HAsO_2 + H_2SO_4$$

As the foregoing reduction proceeds, the $HAsO_2$ arsenious acid, becomes insoluble in the reaction mixture and forms arsenic trioxide solids according to the following reaction:

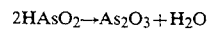

$$2HAsO_2 \rightarrow As_2O_3 + H_2O$$

Referring to the FIGURE which is meant to be illustrative and non-limiting, the waste mixture as indicated by arrow 12 and sulfur (IV) compound as indicated by arrow 14 may be fed into reactor 16. Preferably, the waste mixture is agitated in order to increase the contact between the sulfur (IV) compound and the waste mixture so as to substantially convert the arsenic acid to arsenic (III) compound and to produce a mixture comprising arsenic (III) compound, the sulfur (IV) compound, sulfuric acid, unconverted arsenic acid, and water. The term "arsenic (III) compound" as used herein means one or more of the following trivalent arsenic forms: $H_3AsO_3$, $HAsO_2$, $As_2O_3$, and $AsF_3$.

Reactor 16 should be constructed of a material which is not attacked by the corrosive waste mixture so as to preclude contamination and ensure equipment longevity. Accordingly, all surfaces of reactor 16 which come into contact with the corrosive waste mixture should be inert to the corrosive waste mixture.

The excess sulfur (IV) compound in step (a) may be vented through arrow 18 to scrubber 20 and the purged gas is vented through arrow 22. The excess sulfur (IV) compound may also be recovered instead of scrubbed and reused in the present process.

In order to ultimately generate arsenic and sulfuric acids which are free of sulfur (IV) compound, the mixture resulting from step (a) is purged with gas in step (b) so as to substantially remove the sulfur (IV) compound from the mixture wherein the purged mixture comprises the arsenic (III) compounds, sulfuric acid, unconverted arsenic acid, and water. Any gas which is capable of substantially removing all of the sulfur (IV) compound and does not oxidize the arsenic (III) compound back to arsenic acid may be used for step (b). Examples of useful gases include air, nitrogen, steam, carbon dioxide, and methane. The preferred gas is air. Mixtures of gases may also be used. Preferably, the sulfur (IV) compound is substantially removed as sulfur dioxide gas.

Referring to the FIGURE, inert gas may be introduced through arrow 24 into the reaction mixture in reactor 16. The excess gas may also be vented through arrow 18 to scrubber 20 and vented through arrow 22.

Step (c) comprises treating the purged mixture under conditions sufficient to substantially separate the arsenic (III) compounds from the purged mixture. The arsenic trioxide solids may be removed from the mixture by filtering or other solid liquid separation technique enabling separation of substantially all the arsenic solids. The solids are unpure at this point and contain unacceptable quantities of sulfuric acid and other impurities for most uses. The residual sulfuric acid in the liquid phase may be reused in the process of commonly assigned U.S. Pat. No. 5,089,241. In one embodiment, the treatment comprises physically separating the arsenic (III) compound from the purged mixture. In another more advantageous embodiment, hydrogen fluoride is added to the starting mixture in step (a) or to the purged mixture of step (c) in an amount sufficient to substantially convert the arsenic (III) compound to arsenic trifluoride. Preferably, the amount of hydrogen fluoride added is at least about twice the weight percent of the arsenic (III) compound. This embodiment is advantageous because it involves a liquid stream which avoids the hygienic and environmental problems associated with separating a solid phase.

Thus, in step (c), the following reactions occur in the preferred embodiment:

$$HAsO_2 + 3HF \rightarrow AsF_3 + 2H_2O$$

$$As_2O_3 + 6HF \rightarrow 2AsF_3 + 3H_2O$$

Preferably, in the more advantageous embodiment, sulfuric acid is added in step (c) in an amount sufficient and at a temperature sufficient to substantially volatilize the arsenic trifluoride wherein the volatilization substantially separates the arsenic trifluoride from the purged mixture. Sulfuric acid is added as necessary to the mixture resulting from step (b) in order to decrease the solubility of the formed arsenic trifluoride in the resulting mixture. The sulfuric acid may be added to the mixture resulting from step (b) before or after the hydrogen fluoride is added or simultaneously with the hydrogen fluoride addition.

The heat of dilution of sulfuric acid raises the mixture temperature. Any commercially available heating means may also be used to raise the mixture temperature so as to substantially volatilize the formed arsenic trifluoride. Preferably, the amount of sulfuric acid added is at least about 50 percent by weight based on the total amount of the purged mixture and the temperature is at least about 120° C. More preferably, the temperature is about 120° C. to about 130° C.

Referring to the FIGURE, the hydrogen fluoride may be fed as indicated by arrow 26 into the reactor 16. The volatilized arsenic trifluoride may then be fed from reactor 16 as indicated by arrow 28 into vessel 30.

The volatilization of the arsenic trifluoride separates the arsenic trifluoride from the mixture. Regardless of which method is used to separate the arsenic (ill) compound from the purged mixture in step (c), the residual mixture in reactor 16 comprises sulfuric acid and a small portion of the starting arsenic acid and water. This sulfuric acid mixture may then be reused. As an example, the sulfuric acid may be reused in the process of commonly assigned U.S. Pat. No. 5,089,241. Thus, the present process is advantageous in separating arsenic acid from sulfuric acid such that the sulfuric acid may be reused.

In step (d), the separated arsenic (III) compound is reacted with an oxidizing agent under conditions sufficient to substantially convert the arsenic (III) compound to arsenic acid wherein the final mixture comprises arsenic acid, unreacted oxidizing agent, and water.

Step (d), comprises the formation of the arsenic acid product either by reacting the arsenic (III) solids obtained by physical separation such as filtration from step (a) or from the arsenic trifluoride separated by volatilization in step (c) with a suitable oxidizing agent such as hydrogen peroxide.

The reaction between the arsenic trifluoride or the arsenic trioxide solids occurs rapidly at room temperature with stoichiometric quantities of reactants. To ensure complete conversion to arsenic acid occurs, a 10% excess of oxidizing agent may be added. Commercially available hydrogen peroxide may be used for this reaction. The resulting solution from step (d) contains arsenic acid, water, hydrogen fluoride, and undecomposed oxidizing agent.

Any oxidizing agent which absorbs the arsenic trifluoride, (or reacts with the $As_2O_3$ solids), oxidizes the arsenic (III) compound to arsenic acid, and does not contaminate the arsenic acid may be used. Examples of useful oxidizing agents include commercially available hydrogen peroxide, or nitric acid. Nitric acid requires the use of a catalyst such as potassium iodide. The preferred oxidizing agent is hydrogen peroxide because hydrogen peroxide reacts rapidly, decomposes readily, does not require a catalyst, and does not impart any impurity into the arsenic acid product. The reaction between arsenic trifluoride (or $As_2O_3$ solids) and hydrogen peroxide occurs instantaneously at room temperature.

If hydrogen peroxide is used in step (d) as the oxidizing agent, the following reactions occur:

$$AsF_3 + 3H_2O_2 \rightarrow H_3AsO_4 + 3HF + O_2 \quad As_2O_3 + 3H_2O_2 \rightarrow 2H_3AsO_4 + \tfrac{1}{2}O_2 \quad 2H_2O_2 \rightarrow 2H_2O + O_2$$

Referring to the FIGURE, the volatilized arsenic trifluoride (or $As_2O_3$ solids) may be fed into vessel 30 which contains the oxidizing agent. Vessel 30 should be constructed of a material which is not attacked by the oxidizing agent or the acid solution so as to preclude contamination and ensure equipment longevity. Accordingly, all surfaces of the vessel 30 which come into contact with the oxidizing agent must be inert to the oxidizing agent and the acid solution so as not to contaminate the final arsenic acid product. The solution resulting from step (d) comprises arsenic acid, water, hydrogen fluoride, and unreacted oxidizing agent.

Step (e) comprises removing impurities from the final mixture, wherein the impurities comprise unreacted oxidizing agent, to provide substantially pure aqueous arsenic acid. If the final mixture further comprises hydrogen fluoride, the impurities further comprise hydrogen fluoride. Preferably, step (e) comprises heating the final mixture at a temperature sufficient to substantially decompose unreacted oxidizing agent.

Preferably, the final mixture is heated at a temperature sufficient to substantially decompose the unreacted oxidizing agent. More preferably, the final mixture is heated to about 120° C. to about 130° C. for about 15 to about 30 minutes.

The hydrogen fluoride is removed by breaking the hydrogen fluoride—water azeotrope. Preferably in step (e), the final mixture is heated at a temperature sufficient to substantially remove the hydrogen fluoride and water and a gas is passed through the heated mixture in a quantity sufficient to substantially remove the hydrogen fluoride in the heated mixture from the heated mixture. This may be accomplished by concentrating the mixture to give an arsenic acid concentration greater than about 50 percent by weight and stripping with a gas such as air or steam. A portion of the purified arsenic acid may be recycled back to this step as required to break the hydrogen fluoride—water azeotrope. As taught by commonly assigned U.S. Pat. No. 5,089,241, hexafluoroarsenic acid may be formed by the following reaction:

$$H_3AsO_4 + 6HF \rightarrow HAsF_6 + 4H_2O$$

and thus, be present in the mixture. In order to hydrolyze the hexafluoroarsenic acid to arsenic acid, substantially all of the hydrogen fluoride must be removed.

In order to substantially hydrolyze the hexafluoroarsenic acid to arsenic acid, the amount of water present has to be sufficient. Additionally, the water prevents the arsenic acid from solidifying. Otherwise, arsenic acid which is concentrated at greater than 80% solidifies easily to form solid hydrates of $As_2O_5$.

Although hexafluoroarsenic acid will be partially converted to arsenic acid in the presence of hydrogen fluoride, substantially all of the hydrogen fluoride must be removed from the mixture in order to effect transformation of substantially all of the hexafluoroarsenic acid to arsenic acid. Because hydrogen fluoride and water form an azeotrope when the weight percent of the hydrogen fluoride based on the total weight of the hydrogen fluoride and water is at least 38, arsenic acid has to be present in an amount sufficient to break the azeotrope. Generally, the amount of arsenic acid required to break the azeotrope between hydrogen fluoride and water is at least about 45 weight percent based on the total weight of the aqueous mixture.

Any commercially available means for heating the final mixture may be used. For example, external heat may be supplied by a heater around vessel 30. Preferably, the temperature of the reaction mixture is about 120° C. to about 130° C. If the reaction temperature is much below about 100° C., the amount of hydrogen fluoride removed is inadequate; the lack of appropriate materials of construction prevents the use of reaction temperatures much higher than about 150° C. More preferably, the temperature of the reaction mixture is about 120° C. to about 125° C.

Most preferably, the amount of arsenic acid is at least about 50 weight percent and the temperature of the reaction mixture is about 120° C. The removal of substantially all the hydrogen fluoride also ensures the conversion of the hexafluoroarsenic acid to arsenic acid which affects the final arsenic acid product purity.

A gas as indicated by arrow 32 is passed through the heated mixture in a quantity sufficient to remove substantially all of the hydrogen fluoride in the heated mixture from the heated mixture. Any gas which is capable of removing substantially all of the hydrogen fluoride may be used for this step. Examples of useful gases include steam, air, nitrogen, methane, and carbon dioxide. Mixtures of gases may also be used.

The amount of gas required is a function of the reaction temperature at which the gas is added. For example at a reaction temperature of 150° C., a minimum of about ten moles of gas per mole of hydrogen fluoride in the reaction mixture prior to gas addition is required in order to substantially remove all of the hydrogen fluoride. Because the partial pressure of hydrogen fluoride increases with temperature, higher reaction temperatures require less gas while lower reaction temperatures require more gas. Also, the degree and uniformity of mixing of the gas with the liquid reaction mixture are factors in determining the amount of gas to be used.

The gas may be vented as indicated by arrow 34 to scrubber 20 and vented through arrow 22. The vaporized anhydrous hydrogen fluoride flows as indicated by arrow 36 out of vessel 30 and may be reused. The substantially pure aqueous arsenic acid which preferably comprises at least about 50 weight percent arsenic acid may be transferred as indicated by arrow 38 to storage tank 40.

The separated arsenic acid may be reused. As an example, the separated arsenic acid may be used as a material in the production of a CCA wood preservative. Thus, the present invention provides a process for separating arsenic acid from a waste mixture comprising sulfuric and arsenic acids and water wherein the separated arsenic acid may be reused and the remaining sulfuric acid may also be reused. The present process is advantageous because it eliminates the current need for converting the hazardous arsenic waste to non-hazardous waste, stabilizing the non-hazardous waste, and landfilling the non-hazardous waste.

The present invention is more fully illustrated by the following non-limiting Examples.

EXAMPLES

For the following Examples, the starting waste material had the composition in Table I below:

TABLE I

| COMPONENT | WEIGHT PERCENT |
|---|---|
| Hydrofluoric Acid | <0.1 |
| Arsenic Acid | 9.1 |
| Sulfuric Acid | 55.9 |
| Water | 35 |
| $HAsF_6$ | <50 ppm |

EXAMPLE 1

The starting waste having the composition above was mixed with water and contacted with sulfur dioxide gas under the pressure indicated in Table II below at ambient temperature. Agitation was used to ensure sufficient contact of the reactants. The percent conversion of $As^{+5}$ to $As^{+3}$ was determined by commonly known Ion Chromatographic analysis techniques. The results are also in Table II.

TABLE II

| | |
|---|---|
| Waste, grams | 20 |
| $H_2O$, grams | 20 |
| $H_2SO_4$, added grams | 0 |
| $SO_2$, Psig | 38 |
| Time, hours | 2.5 |

TABLE II-continued

| Conversion, % | 70 |
| --- | --- |

The conversion of arsenic (V) to arsenic (III) in step (a) was 70 percent.

EXAMPLE 2

The following example illustrates the separation and recovery of arsenic solids ($As_2O_3$). The results are in Table III below.

TABLE III

| Waste, grams | 25 |
| --- | --- |
| Start As, grams | 1.2 |
| AS(III) Soluble, grams | 0.36 |
| As (III) Solids, recovered grams | 0.77 |
| AS(III) Solids, % | 64 |

Over 60% of the starting arsenic in the waste was recovered as arsenic (III) solids.

Example 2 involved handling arsenic solids and filtration and washing steps which lead to hygiene and environmental problems. The following examples demonstrate a liquid reaction that avoids these problems.

EXAMPLE 3

To avoid handling arsenic solids, the following example shows that the arsenic (III) solids may be dissolved in aqueous hydrofluoric acid and volatilized with heat as arsenic trifluoride by adding sulfuric acid and heating the solution to about 125° C. The reduction of the arsenic (V) to arsenic (III) was conducted as in Example 1.

The results are in Table IV below.

TABLE IV

| START | Red Mix, grams | 40 |
| --- | --- | --- |
| | Solids, grams | 0.67 |
| | $H_2SO_4$ added, grams | 44 |
| | HF added, grams | 5 |
| | HF, % | 5.7 |
| | Temperature, °C. | 125 |
| | Time, hours | 1 |
| RESIDUE | As Removed, % | 99+ |
| | HF, % | <0.5 |
| | $H_2SO_4$, % | 82 |

This example demonstrates that the arsenic solids do not have to be separated by a means such as filtration. The hydrogen fluoride dissolves the solids which eliminates the hygiene and environmental problems inherent with solids handling.

EXAMPLE 4

It was determined that any sulfur dioxide remaining in the solution after the reduction step will also be volatilized which will contaminate the product. The reduction of the arsenic (V) to arsenic (III) was conducted as in Example 1 above. The following example shows that a slow gas purge at room temperature will remove the sulfur dioxide but not the arsenic (III) even in the presence of hydrofluoric acid. The results are in Table V below.

TABLE V

| STARTING | Reduced Mix, grams | 35 |
| --- | --- | --- |
| | Total Acid as $H_2SO_4$, % | 53 |
| | HF, % | 6.4 |
| | As (III), % | 2.2 |
| | $SO_2$, % | 1.6 |
| $N_2$ PURGE | Time, Min. | 30 |
| PURGED MIX | As (III), % | 2.2 |
| | $SO_2$, % | <0.01 |

EXAMPLES 5 AND 6

Arsenic acid manufacturers react arsenic (III) oxide with nitric acid in the presence of potassium iodide as a catalyst. Thus, arsenic trifluoride, which is more reactive than the oxide, could also react in a similar manner. This reaction produces nitrogen oxide gases that must be contained. The nitrogen oxide gases and the potassium iodide could contaminate our product arsenic acid. The following examples show that hydrogen peroxide acts as an oxidizer for the arsenic (III) as arsenic (III) solids or trifluoride. Arsenic trifluoride reagent from a commercial supplier was added to a solution of 5% hydrogen peroxide. The results are set forth in Table VI below.

TABLE VI

| | | EX 5 | EX 6 |
| --- | --- | --- | --- |
| ADDED | $H_2O_2$ Solution, grams | 50 | 0.1 |
| | $AsF_3$, grams | 2.8 | — |
| | Calc HF, % | 2.4 | — |
| | $As_2O_3$, grams | — | 0.13 |
| FINAL | As (III), % | <0.02 | — |
| | HF, % | 2.3 | — |
| | $H_3AsO_4$, % | 8.5 | — |
| | As(V) found, grams | 1.6 | 0.0995 |
| | As(V) Converson, % | 100 | 100 |

The above examples show that hydrogen peroxide was an efficient oxidizer for the arsenic (III) to arsenic (V). At ambient temperature, the conversion was rapid and complete. The mixture was then boiled for one hour to try to remove the hydrofluoric acid. The volume was maintained by adding water. The results indicate that hydrofluoric acid was difficult to remove from weak mixtures of hydrofluoric and arsenic acid.

EXAMPLE 7

This example demonstrates the decomposition of the hydrogen peroxide after generation of a mixture in the manner of Examples 5 and 6 above. Removal of the excess hydrogen peroxide was necessary for a pure arsenic acid product. The mixture was heated at the indicated temperatures and time to concentrate the solution and decompose the hydrogen peroxide. The results are in Table VII below.

TABLE VII

| Start | $H_2O_2$, % | 4.5 |
| --- | --- | --- |
| | $H_3AsO_4$, % | 6.0 |
| Heat | Temperature, (°C.) | 95–100 |
| | Time, hours | 2.5 |
| | $H_2O_2$, % | 2.2 |
| | $H_3AsO_4$, % | 8.75 |
| Reheat | Temperature, (°C.) | 130 |
| | Time, hours | 4 |
| | $H_2O_2$, % | 0.03 |
| | $H_3AsO_4$, % | 16.6 |

This example indicates that some of the hydrogen peroxide is decomposed but not all in a reasonable time at about 100° C. At the higher temperature, the hydrogen peroxide was decomposed at the end of the heating period. The hydrogen peroxide may have been decomposed sooner but no samples were taken.

EXAMPLE 8

The following example shows that the hydrofluoric acid can be removed from the impure arsenic acid mixture by increasing the arsenic acid concentration and temperature of the solution. Arsenic acid will break the hydrofluoric acid/water azeotrope. The mixture was heated and purged with nitrogen as an inert gas. Water was important for removing the hydrofluoric acid and preventing the arsenic acid from solidifying (converting to arsenic (V) oxide). The initial volume was maintained by water addition. A synthetic mixture of arsenic acid and hydrofluoric acid was used for the experiments. The results are in Table VIII below.

TABLE VIII

| Start: | |
| --- | --- |
| $H_2O$, % | 29.5 |
| HF, % | 8.7 |
| $H_3AsO_4$, % | 61.6 |
| Conditions: | |
| Temperature, (°C.) | 120–140 |
| $N_2$ Rate, cc/min | 50–100 |
| Time, hours | 5 |
| Final: | |
| $H_3AsO_4$, % | 51.3 |
| HF, % | 0.2 |
| $H_2O$, % | 48.5 |

This example demonstrates that the hydrofluoric acid may be removed in a reasonable time at a reasonable temperature. It is felt that in actual commercial operation the time required for removal of the hydrofluoric acid would be reduced.

EXAMPLE 9

The arsenic acid product was made starting from the original waste following through the process steps as described above. The final product had the composition of Table IX below:

TABLE IX

| $H_3AsO_4$, % | 46 |
| --- | --- |
| HF, % | <0.5 |
| $H_2SO_4$, % | <1 |
| $HAsF_6$, ppm | 19 |
| Fe, ppm | <50 |
| Pb, ppm | <50 |

This final product could be made more concentrated by stopping the water addition after the hydrofluoric acid and hydrogen peroxide were removed. This product may be used as a saleable product or as a raw material for the production of the CCA wood preservative.

What is claimed is:

1. A process for recovering arsenic acid, $H_3AsO_4$, from a starting mixture comprising sulfuric and arsenic acids and water comprising the steps of:
(a) treating a starting mixture, wherein said starting mixture comprises at least about 1 weight percent arsenic acid, $H_3AsO_4$, and at least about 1 weight percent sulfuric acid and up to about 98 weight percent water based on the total amount of said starting mixture, with a sulfur (IV) compound which will reduce the arsenic acid, $H_3AsO_4$, to an arsenic (III) compound, in order to convert said arsenic acid, $H_3AsO_4$, to an arsenic (III) compound and then reacting the arsenic (III) compound with hydrogen fluoride in an amount sufficient to convert the arsenic (III) compound to arsenic trifluoride to thereby produce a resulting mixture which comprises arsenic trifluoride, the sulfur (IV) compound, sulfuric acid, hydrogen fluoride and water;
(b) purging the resulting mixture with a gas which does not oxidize the arsenic trifluoride back to arsenic acid, $H_3AsO_4$, in order to remove the sulfur (IV) compound from the resulting mixture to thereby produce a purged mixture which comprises the arsenic trifluoride, sulfuric acid, hydrogen fluoride and water;
(c) separating the arsenic trifluoride from the purged mixture;
(d) reacting the separated arsenic trifluoride from step (c) with an oxidizing agent in order to convert the arsenic trifluoride to arsenic acid, $H_3AsO_4$, to thereby produce a final mixture which comprises arsenic acid, $H_3AsO_4$, unreacted oxidizing agent, hydrogen fluoride and water; and
(e) removing impurities from the final mixture, wherein the impurities comprise hydrogen fluoride and unreacted oxidizing agent, to provide substantially pure aqueous arsenic acid, $H_3AsO_4$.

2. The process of claim 1 wherein in said step (a), said sulfur (IV) compound is selected from the group consisting of sulfur dioxide, sulfurous acid, sodium bisulfite, potassium bisulfite, ammonium bisulfite, sodium sulfite, potassium sulfite, and ammonium sulfite.

3. The process of claim 1 wherein in step (a), said sulfur (IV) compound is sulfur dioxide.

4. The process of claim 1 wherein in step (a), said starting mixture is agitated in an amount sufficient to produce intimate contact between said starting mixture and said sulfur (IV) compound.

5. The process of claim 3 wherein said sulfur dioxide is introduced at a pressure greater than about 20 pounds per square inch into said starting mixture.

6. The process of claim 1 wherein in step (a), the treating is at a temperature of about 20° C. to about 30° C. and a time of at least about 2 hours.

7. The process of claim 1 wherein in step (b), the gas is selected from the group consisting of air, nitrogen, methane, steam, carbon dioxide, and mixtures thereof.

8. The process of claim 1 wherein in step (c), the separating comprises adding sulfuric acid to the purged mixture in an amount sufficient and at a temperature sufficient to volatilize the arsenic trifluoride which substantially separates the arsenic trifluoride from the purged mixture.

9. The process of claim 11 wherein the amount of sulfuric acid added during step (c) is at least about 50 weight percent based on the total amount of the purged mixture and the temperature of the purged mixture is at least about 120° C.

10. The process of claim 1 wherein in step (d), said oxidizing agent is hydrogen peroxide.

11. The process of claim 1 wherein in step (e), said final mixture is heated at a temperature sufficient to decompose said unreacted oxidizing agent.

12. The process of claim 1 wherein in step (e), the final mixture is heated at a temperature sufficient to substantially remove the hydrogen fluoride and water and a gas is passed through the heated final mixture in a quantity sufficient to remove the hydrogen fluoride in the heated final mixture from the heated final mixture.

13. The process of claim 1 wherein in step (e), said substantially pure aqueous arsenic acid comprises at least about 50 weight percent said arsenic acid.

14. The process of claim 11 wherein in step (e), the temperature for removing impurities from the final mixture is about 120° C. to about 130° C.

15. The process of claim 12 wherein in step (e), the temperature for removing impurities from the final mixture is about 120° C. to about 130° C.

16. The process of claim 12 wherein in step (e), the gas is selected from the group consisting of steam, air, nitrogen, methane, carbon dioxide, and mixtures thereof.

17. A process for recovering arsenic acid, $H_3AsO_4$, from a starting mixture comprising sulfuric and arsenic acids and water comprising the steps of:

(a) treating a starting mixture, wherein said starting mixture comprises at least about 1 weight percent arsenic acid, $H_3AsO_4$, and at least about 1 weight percent sulfuric acid and up to about 98 weight percent water based on the total amount of said starting mixture, with a sulfur (IV) compound which will reduce the arsenic acid, $H_3AsO_4$, to an arsenic (III) compound, in order to convert said arsenic acid, $H_3AsO_4$, to an arsenic (III) compound to thereby produce a resulting mixture which comprises the arsenic (III) compound, the sulfur (IV) compound, sulfuric acid, and water;

(b) purging the resulting mixture with a gas which does not oxidize the arsenic (III) compound back to arsenic acid, $H_3AsO_4$, in order to remove the sulfur (IV) compound from the resulting mixture to thereby produce a purged mixture which comprises the arsenic (III) compound, sulfuric acid, and water;

(c) treating the purged mixture with hydrogen fluoride in an amount sufficient to convert the arsenic (III) compound to arsenic trifluoride and then separating the arsenic trifluoride from the purged mixture;

(d) reacting separated arsenic trifluoride from step (c) with an oxidizing agent in order to convert the arsenic trifluoride to arsenic acid, $H_3AsO_4$, to thereby produce a final mixture which comprises arsenic acid, $H_3AsO_4$, unreacted oxidizing agent, hydrogen fluoride and water; and (e) removing impurities from the final mixture, wherein the impurities comprise hydrogen fluoride and unreacted oxidizing agent, to provide substantially pure aqueous arsenic acid, $H_3AsO_4$.

18. The process of claim 17 wherein in step (c), the treating comprises adding sulfuric acid to the purged mixture in an amount sufficient and at a temperature sufficient to volatilize the arsenic trifluoride which substantially separates the arsenic trifluoride from the purged mixture.

19. The process of claim 18 wherein the amount of sulfuric acid added during step (c) is at least about 50 weight percent based on the total amount of the purged mixture and the temperature of the purged mixture is at least about 120° C.

20. The process of claim 17 wherein in step (d), said oxidizing agent is hydrogen peroxide.

21. The process of claim 20 wherein in step (e), said final mixture is heated at a temperature sufficient to decompose said unreacted oxidizing agent.

22. The process of claim 17 wherein in step (e), the final mixture is heated at a temperature sufficient to remove the hydrogen fluoride and water and a gas is passed through the heated final mixture in a quantity sufficient to remove the hydrogen fluoride in the heated final mixture from the heated final mixture.

23. The process of claim 21 wherein in step (e), said substantially pure aqueous arsenic acid comprises at least about 50 weight percent said arsenic acid.

24. The process of claim 22 wherein in step (e), the removing temperature for removing impurities from the final mixture is about 120° C. to about 130° C.

25. The process of claim 22 wherein in step (e), the gas is selected from the group consisting of steam, air, nitrogen, methane, carbon dioxide, and mixtures thereof.

* * * * *